US012228692B2

(12) United States Patent
Sechet et al.

(10) Patent No.: US 12,228,692 B2
(45) Date of Patent: Feb. 18, 2025

(54) CLOUD-BASED, TIME-LIMITED, CONFIDENTIALITY-RATED DATA MANAGEMENT SYSTEM FOR SEISMIC DATA ACQUISITION AND METHOD

(71) Applicant: SERCEL, Carquefou (FR)

(72) Inventors: Olivier Sechet, Carquefou (FR); Samuel Valla, Carquefou (FR)

(73) Assignee: SERCEL, Carquefou (FR)

( * ) Notice: Subject to any disclaimer, the term of this patent is extended or adjusted under 35 U.S.C. 154(b) by 131 days.

(21) Appl. No.: 17/960,184

(22) Filed: Oct. 5, 2022

(65) Prior Publication Data
US 2024/0118443 A1    Apr. 11, 2024

(51) Int. Cl.
*G01V 1/34* (2006.01)
(52) U.S. Cl.
CPC ...... *G01V 1/345* (2013.01); *G01V 2210/1295* (2013.01); *G01V 2210/1425* (2013.01); *G01V 2210/74* (2013.01)

(58) Field of Classification Search
None
See application file for complete search history.

(56) References Cited

U.S. PATENT DOCUMENTS 8,805,956 B1 *  8/2014  Yang ............... H04N 21/23113
                                                        709/217
2013/0185773 A1   7/2013  Flanagan
2015/0085604 A1 *  3/2015  Flanagan ............... G01V 1/003
                                                        367/14
2021/0026030 A1   1/2021  Dixon et al.
2022/0103650 A1 *  3/2022  Tanaka ................. G06F 3/0638

FOREIGN PATENT DOCUMENTS

GB          2593019 A        9/2021

OTHER PUBLICATIONS

Hong-Ning Dai et al., "Big Data Analytics for Large-scale Wireless Networks: Challenges and Opportunities," ACM Computing Surveys, Sep. 2019, vol. 52, No. 5, Article 99, pp. 99:1-99:36.
International Search Report/Written Opinion dated Jan. 22, 2024 in related/corresponding International Application No. PCT/IB2023/000560.

* cited by examiner

*Primary Examiner* — Raymond L Nimox
(74) *Attorney, Agent, or Firm* — PATENT PORTFOLIO BUILDERS PLLC

(57) ABSTRACT

A cloud-based, time-limited, confidentiality-rated data management system for survey ancillary data associated with acquisition of seismic data during at least one seismic survey. The system includes a database module configured to store in a first region the survey ancillary data, a data application configured to interact with the database module and upload or download the survey ancillary data, a time module configured to count a lifetime associated with the survey ancillary data, and an erase module configured to erase the survey ancillary data from the database module at the end of the lifetime counted by the time module. The lifetime of the survey ancillary data is shorter than a duration of the seismic survey.

21 Claims, 6 Drawing Sheets

CLOUD-BASED, TIME-LIMITED, CONFIDENTIALITY-RATED DATA MANAGEMENT SYSTEM FOR SEISMIC DATA ACQUISITION AND METHOD

BACKGROUND

Technical Field

Embodiments of the subject matter disclosed herein generally relate to methods and systems used in conjunction with systems for acquiring seismic data, and more specifically, to a confidentiality-rated information management system that is cloud-based and has a time-limited storage policy.

Discussion of the Background

Land seismic data acquisition and processing may be used to generate a profile (image) of the geophysical structure under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine whether the oil and gas reservoirs are located.

Geophysical prospectors generate seismic waves in order to probe the subsurface (e.g., for imaging the earth). These acoustic waves may be generated from an explosive, implosive, impulsive, or a vibratory source executing swept-frequency (chirp) or pseudo-random sequence. Recordings of the acoustic reflection and/or refraction wavefronts that travel from the source to a receiver are used to produce a seismic field record. Variations in the travel times of the reflection events in these field records indicate the position of reflection and/or refraction surfaces within the earth.

A swept-frequency or chirp type seismic source may use a long pilot signal to ensure sufficient energy is imparted to the earth. With a swept-frequency type source (also called vibratory source herein), the energy is emitted in the form of a sweep of regularly increasing (upsweep) or decreasing (downsweep) frequency in the seismic frequency range. The vibrations of the vibratory source are controlled by a control system, which can control the frequency and phase of the emitted seismic signals. These vibratory sources are low energy and, thus, this causes noise problems that may affect the recorded seismic data. For example, the vibratory source generated harmonic energy may be an additional source of energy manifesting as noise, distortion or interference with recorded data. Generally for chirps, the vibratory source emits only one frequency at a time and its harmonics, so nonlinear coupling effects in the earth will result in noise that is indistinguishable from the harmonic noise.

In order to increase the energy imparted into the ground, plural vibratory sources may be deployed and actuated simultaneously. The waves emitted by each vibrator in the set, or "fleet," will sum in the downwards direction, which is usually the desired direction of emission to sound the subsurface of the Earth. The downgoing waves interfere constructively, resulting in a stronger signal propagating into the subsurface. In other directions, the interference will not necessary be constructive. In particular, horizontally-propagating Rayleigh waves, which carry little information regarding the deeper contents of the Earth and are usually regarded as harmful noise, may be attenuated.

Currently, for reducing the seismic survey time, multiple sets of vibratory sources are deployed at various locations. In order to complete a seismic survey, seismic waves must be emitted at multiple pre-determined locations. In order to reduce the survey time and cost, multiple sets of vibratory sources may be used concurrently. Each set alternatively moves between locations where waves are to be emitted and stops to emit seismic waves. There may also be a waiting time between the end of the movement phase and the start of the emission. The parameters associated with: the movement of the multiple sets of vibratory sources, the firing of the seismic sources, the communication between the various components of the seismic survey, the locations of the seismic sources, the locations of the seismic receivers, etc. are characterized as survey ancillary data. Increasing the number of source sets increases not only the amount of time spent imparting seismic waves into the ground, and thus, the area covered by the survey in a given time, but also the amount of survey ancillary data that needs to be shared among the various parts of the seismic acquisition system.

However, increasing the number of source sets also increases the amount of seismic data (which is different from the survey ancillary data) that is collected by the seismic receivers. In fact, for a typical land seismic acquisition data, it is possible to acquire hundreds of thousands of receiver readings, which may amount to gigabytes of seismic information. All this information needs to be sent to a central unit for packaging and then to a processing center for processing. Various methods are known in the art for achieving this goal. In one approach, the operator of the survey physically reaches all the receivers and transfers data from them to a portable device. Then, this data is transmitted, either via the Internet or physically, to a server at the central unit. Other approaches, as the one described in [1] and [2], proposes a flow over the Internet of the seismic data to a cloud storage array 104, as illustrated in FIG. 1, which corresponds to FIG. 1 of [1] and FIG. 3 of [2]. The system 100 shown in this figure allows an acquisition contractor 110 to communicate via a field application 122 with an application programming interface, API, 108, to push or pull seismic data from the cloud 104. The API 108 interacts with a seismic data application 102 for reaching the seismic data. Various other entities, e.g., processing contractor 112, interpretation contractor 114, geo-steering contractor 116, and resale contractor 130 may also have access to the seismic data in the cloud 104 through various corresponding applications 124, 126, and 128. The owner 106 of the seismic data can give different rights to all these parties for accessing the seismic data, and can add a partner 132 for also accessing the seismic data.

One of the biggest unsolved problems with these cloud-based solutions for sharing and/or processing the collected seismic data is managing the flow of data to be transmitted, besides moreover ensuring the confidentiality of the data which remain stored in the cloud for a long period of time. The fact that so many entities 110, 112, 114, 116, 130, and 132 have accounts to log in into the cloud-based stored seismic data inherently compromises the confidentiality of the seismic data.

Parallel to the seismic data, there is a substantial amount of data that needs to be exchanged between the various components of the seismic survey system, and this data, called herein the "survey ancillary data," is responsible for acquiring the seismic data with high quality. Note that the survey ancillary data is different from the seismic data in the sense that they do not contain information directly derived from the interaction of the source signal with the underground structure. However, the survey ancillary data includes a subset of data, called herein "operational data," which includes information related to, for example, the positions of sources and sensors, which is necessary when processing the seismic data. No survey ancillary data, except for the operational data, is directly used by the processing contractor 112 or the interpretation contractor 114 to generate an image of the subsurface and to determine the presence of an oil or gas reservoir based on this image. The survey ancillary data (with or without the operational data) may also be exchanged between multiple parties associated with the seismic survey that are located at different sites. While the survey ancillary data is desired to be maintained safe, its status is not as strictly regulated as the status of the seismic data. The size of the survey ancillary data is light compared to seismic data, but the amount of the survey ancillary data may also be significant during a seismic survey and needs to be shared on a continuous basis between the various components and/or players of the seismic survey system.

Thus, there is a need for a system that handles not only seismic data but also survey ancillary data associated with the seismic data such that the confidentiality of the data is preserved as much as possible while also giving multiple parties the capability to access the data in real time from various sites around the earth.

SUMMARY

According to an embodiment, there is a cloud-based, time-limited, confidentiality-rated data management system for survey ancillary data associated with acquisition of seismic data during at least one seismic survey. The system includes a database module configured to store in a first region the survey ancillary data, a data application configured to interact with the database module and upload or download the survey ancillary data, a time module configured to count a lifetime associated with the survey ancillary data, and an erase module configured to erase the survey ancillary data from the database module at the end of the lifetime counted by the time module. The lifetime of the survey ancillary data is shorter than a duration of the seismic survey.

According to another embodiment, there is a method for sharing survey ancillary data generated during a seismic survey through a cloud-based, time-limited, confidentiality-rated data management system, and the method includes downloading or uploading the survey ancillary data from or to a database module, which is configured to store in a first region the survey ancillary data, counting, with a time module, a lifetime associated with the survey ancillary data, and erasing, with an erase module, the survey ancillary data from the database module at the end of the lifetime counted by the time module. The lifetime of the survey ancillary information is shorter than a duration of the seismic survey.

According to another exemplary embodiment, there is a non-transitory computer readable medium including computer executable instructions, wherein the instructions, when executed by a computer, implement the method discussed above.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
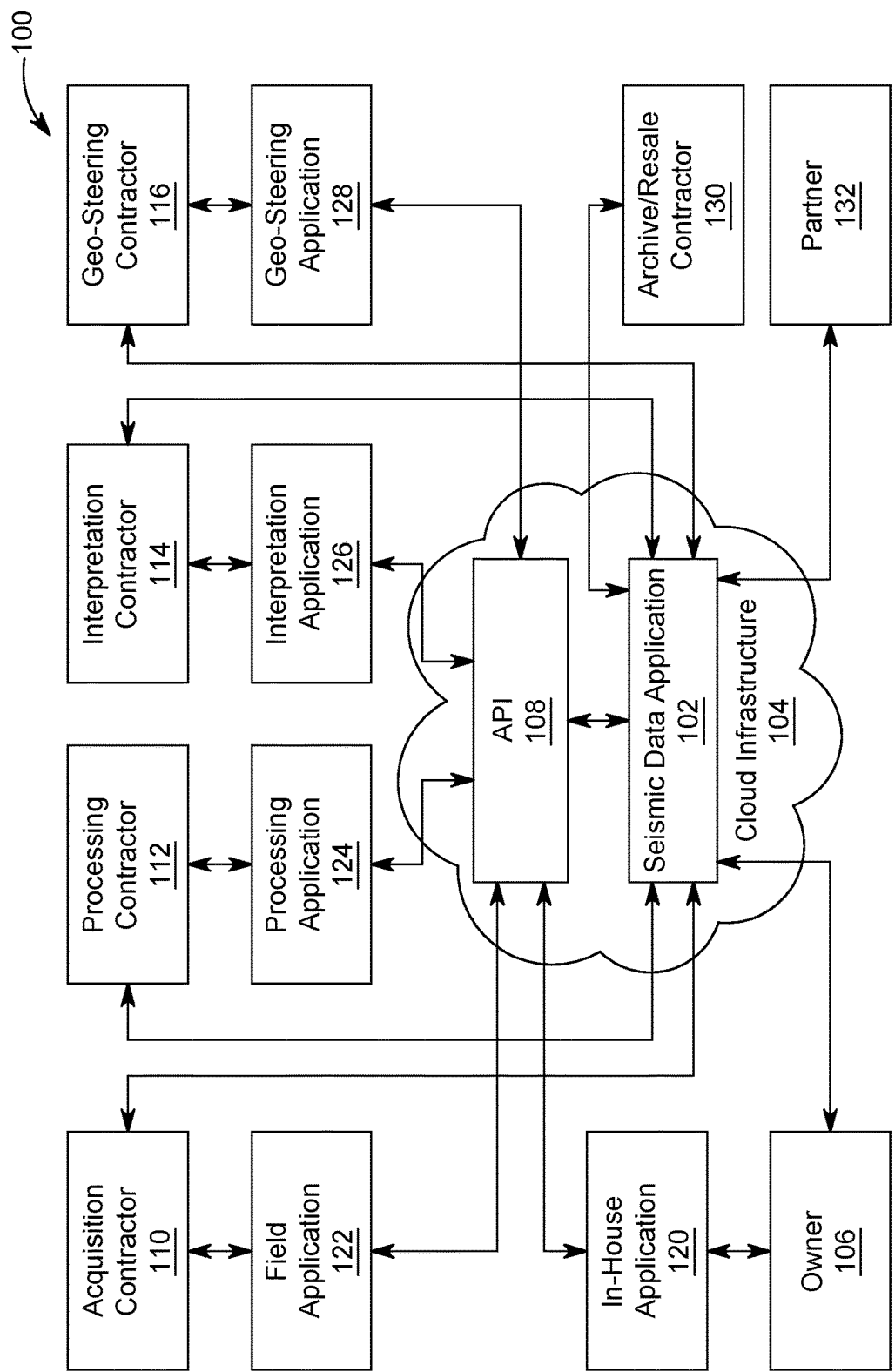
FIG. 1 schematically illustrates a cloud-based server that is configured to store seismic data for processing and access by multiple users.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic system having a set of seismic sources. However, the embodiments to be discussed next are not limited to a land seismic system, but they can be applied to a marine seismic system or to any other seismic acquisition system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Before discussing in more detail a novel method and system for handling survey ancillary data, including operational data, which is possibly associated with handling the seismic data, the structure of a land seismic system 200 that generates seismic waves and collects seismic data is discussed with reference to FIG. 2. The seismic data acquisition system 200 includes plural sets of vibrators 202A and 202B. For simplicity, only two sets of vibrators are shown in the figure, but one skilled in the art would understand that any number N of sets of vibrators may be used. Also for simplicity, the second set of vibrators 202B is illustrated schematically as a box. However, the second set of vibrators 202B may have a configuration similar to the first set of vibrators 202A or may include a different number of vibratory sources.

The first set of vibrator sources 202A (also called vibrators) is shown in the figure including four individual vibratory sources 210, 211, 212, and 213 placed at the surface of the earth 201. Individual vibratory sources 210, 211, 212, and 213 may be conventional truck-mounted vertical P-wave vibrators; however, it is understood that other vibrators, such as horizontal shear-wave vibrators, may be utilized or even a mixture of both P-wave and shear wave vibrators. The deployment of the vibratory sources may vary widely depending upon the survey requirements. For example, for a 3-D survey the vibratory sources may be spaced far apart and not collinear with one another.

Each vibratory source may be equipped with a sweep generator module and control system electronics. For example, FIG. 2 shows vibratory source 213 having the sweep generator module 213a and the control system electronics 213b. After receiving a start command, for example, initiated via a telemetry link 216 with a local controller 229, which may be physically located next to the trucks or far away from them, each vibratory source begins sweeping. The local controller 229 may be in communication with a central unit (CU) 250, via a wired or wireless channel 252 for exchanging survey ancillary data. In one application, the central unit 250 is located in the cloud, i.e., it may be stored in the server of a third-party provider and access to it is achieved through an internet-based connection 252. In another application, the central unit 250 is stored in a private server of the operator of the survey, and access to it is achieved via an internet-based connection 252 or via a proxy. Each vibrator sweep generator may be loaded with a unique pilot signal. In one application, the vibrator sweep generator receives its corresponding pilot signal from the local controller 229 and then starts sweeping based on a given time, which is part of the survey ancillary data. In another embodiment, the vibrator sweep generator receives its pilot signal from the central controller 250.

Sensors (not shown) attached to vibrators 210, 211, 212, and 213 are connected to a vibrator separation system 226. The sensors can be motion sensors, such as accelerometers mounted to the reaction mass, the base plate of the vibrator, or the earth immediately adjacent to the vibrator, a transducer or combination of transducers configured to measure the differential pressure in the actuation chamber of the vibrator, a load cell attached to the bottom of the base plate for measurement of the ground force (contact force), or a weighted sum of the base plate and the reaction mass accelerometers useful for estimating the ground force. Additionally, the sensor could comprise strain gauges mounted on the driven structure of the vibrator to provide an estimate of the ground force. Thus, these sensors provide the ground force signals to the vibrator separation system 226. All the signals exchanged between the sensors and the vibration separation system may be part of the survey ancillary data.

The sensor measurement, or some filtered version of the sensor measurement, is the measured signal and represents the actual source vibration imparted to the earth by the vibrator. In this respect, it is noted that while the vibrator follows a pilot signal, the output of the vibrator (the sweep) may be different from the pilot signal. The measured signals may be transmitted to a recording system 228 by hardwired link, a radio telemetry link, or by a separate acquisition system that records and stores the measured signals so that the measured signals can be integrated with the acquired seismic data set at a later time. The recording system 228 may be implemented in the same hardware as the local controller 229, e.g., a truck or a flying device, or remotely, e.g., at the central unit 250.

Receiver sensors, geophones for example, 220, 221, 222, 223, and 224 are positioned at the surface of the earth 201 (or under the surface) in the survey region at locations displaced from the vibrator position. The receiver sensors may be conventional moving coil type geophones, Micro Electro-Mechanical System (MEMS) sensor elements, or hydrophones for marine applications. In some areas, a receiver sensor may include a group of receiver sensors arranged as a receiver array to help attenuate ground roll or other noise modes. Receiver sensors are not limited to vertical component type sensors; horizontal geophones and 3-C geophones/accelerometers may also be used depending upon the nature of the survey to be conducted. For simplicity, receivers 220, 221, 222, 223, and 224 will be considered single component vertical geophones configured to function as point receivers in this embodiment. In one application, the receivers 220 to 224 are connected to each other with wires or cables 225 and then the same wire or cable may be connected to the local controller 229 for transmitting the seismic data and also for exchanging survey ancillary data.

Figure 2:
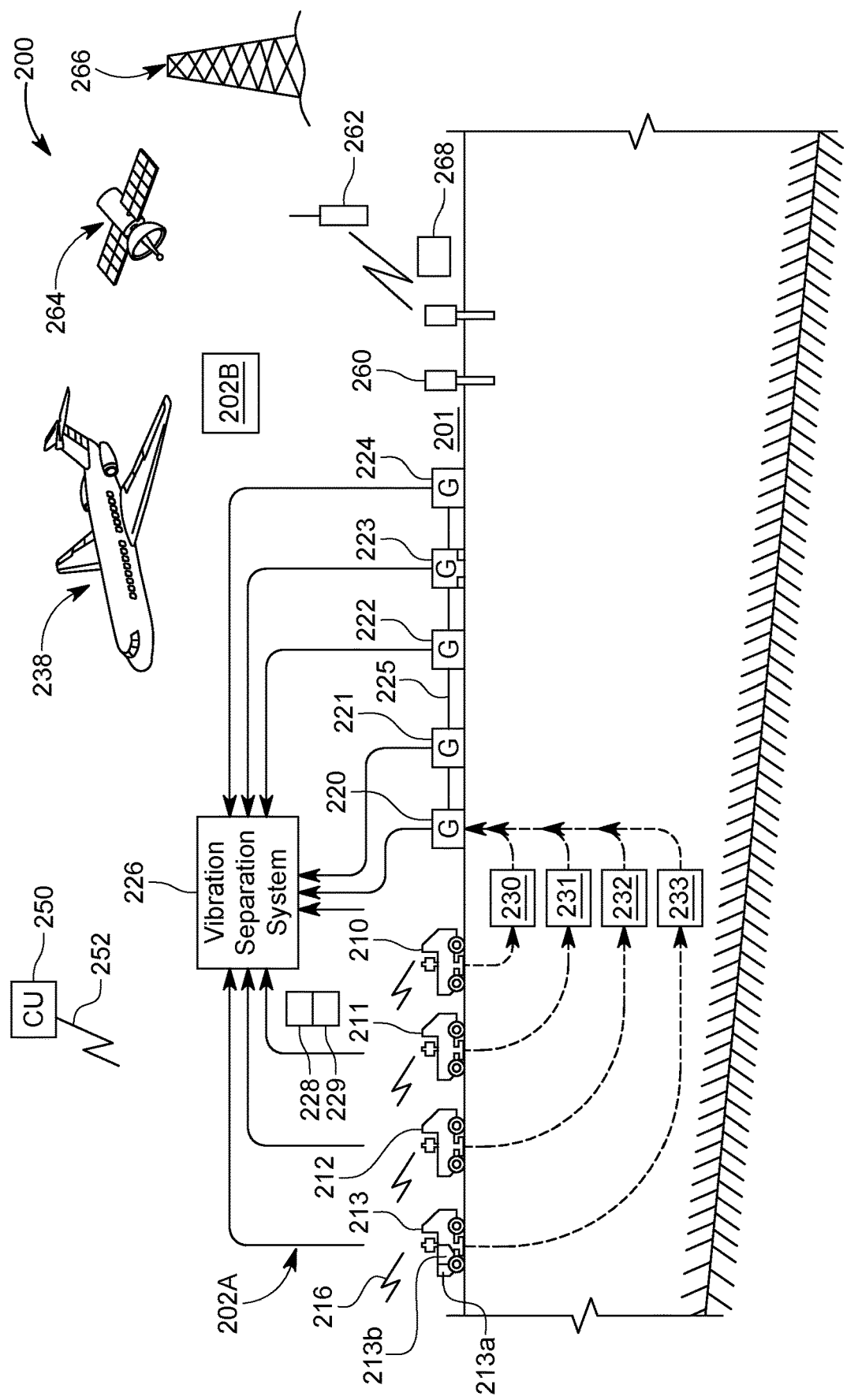
FIG. 2 schematically illustrates a land seismic acquisition system.

As shown in FIG. 2, vibratory energy radiated by each vibratory source 210, 211, 212, and 213 travels through the earth from each vibrator to the receiver sensors 220, 221, 222, 223, and 224 in the survey area. The vibratory signal received by each receiver sensor will actually be a composite signal comprised of contributions from each vibratory source and this is the seismic data. Transfer functions 230, 231, 232, and 233 represent the transmission path response from vibrator 210, 211, 212, and 213 to receiver sensor 220 respectively. The transfer function will depend upon the vibratory signal radiated by each vibratory source, the refraction and reflection by the subterranean formations of the vibratory source energy, and the response of the receiver sensor. Subsequent processing steps can be used to remove the embedded response due to the choice of source measured signal and receiver response. Thus, the seismic data must include information that is associated with the transmission path response from the vibrators to the receiver sensor, namely operational data. Those operational data, which is part of the survey ancillary data, may be duplicated and also stored together with the seismic data as it may also be used for quality control purposes as discussed later. In one application, the survey ancillary data is defined as any data generated and/or used and/or exchanged during a seismic survey that is destroyed or voided at the end of the seismic data survey. Note that although the operational data that is part of the survey ancillary data is destroyed or voided at the end of the seismic survey, the duplicate of the operational data that is stored with the seismic data is maintained until the seismic data is fully processed. In other words, the same operational data is destroyed when part of the survey ancillary data but maintained when part of the seismic data and the operational data in the survey ancillary data and in the seismic data coexist for some time. Note that the seismic data is not destroyed at the end of the seismic data survey, nor the operational data stored with the seismic data survey (although this data is a duplicate of the operational data of the survey ancillary data). Traditionally, after the seismic data is acquired during the seismic data acquisition phase, the processing phase starts in which the seismic data (+operational data if needed) is used to generate a profile of the surveyed subsurface. Depending on how long the seismic data survey is, the processing may start while the seismic data is still being acquired. After the seismic data of the surveyed subsurface is fully acquired, the seismic data acquisition step is over. At this stage, the survey ancillary data is destroyed while the seismic data (including the duplicate operational data) is maintained/preserved. In one application, the survey ancillary data may include a subset of duplicates of the seismic data, which is used for determining a quality of the acquisition phase during the acquisition phase, but this data is destroyed at the end of the seismic data survey.

The system 200 may also include autonomous nodes 260 (only two shown for simplicity) that include one or more seismic receivers. The autonomous nodes may be partially located underground and may also include a power supply, an interface for communicating with a mobile computing device 262, and a memory for storing the recorded seismic data. The mobile computing device 262 may be deployed on the field to move around the autonomous nodes 260 and to collect their seismic data. In one application, the mobile computing device 262 may also exchange survey ancillary data with the nodes, for example, information about the current time, their locations, the time when they should be active, etc. Then, the mobile computing device 262 may be taken to be connected to a communication network, for example, phone network, internet network, satellite-based network, etc., for acquiring access to the central unit 250. In one application each node 260 has a transceiver to directly communicate with an aircraft 238 (e.g., a drone), a satellite 264 or with a communication base station 266, if they are available at the location of the seismic survey. In yet another application, the nodes 260 are configured to communicate with each other, i.e., form a peer network, and the peer network may have a concentrator 268 that collects all the data from a set of the nodes and this concentrator then connects to the mobile computing device 262, or to the controller 229, or to the aircraft 238, or to the satellite 264, or to the base station 266. Various possible implementations may be possible for the system 200 in which a combination of all these nodes is possible.

A seismic survey may last for weeks, and for ensuring a correct acquisition of the seismic data, it is necessary to be sure that the equipment is working properly. In particular, for the wireless autonomous nodes 260, it is advisable to check that, e.g., the battery is not deficient or otherwise the node would fail to record any seismic data. For this reason, it is desired to perform the battery health check more regularly than what a traditional operator physical does on site. Moreover, synchronizing the actions and/or communications of all the components (equipment) of the system 200 relies on sharing other survey ancillary data. The survey ancillary data includes any data exchanged between equipment during a seismic survey, i.e., between any receiver 220-224 or nodes 260, 262 and the local controller 229 and/or the CU 250 with regard to a timing of the recording, a current time, quality control (QC) data, setting up information related to the position of the equipment, the path to be followed by the equipment (for example, by the vibratory sources), a time when the sources should start to vibrate, a time when the sources should stop vibrating, a time when the sources need to move to another location, a new position where the sources need to move, a start/stop time when the receivers should record the seismic data, a start/stop time when the receivers should unload the stored seismic data to the mobile computing device 262, or to the aircraft or other flying drone 238, or to the satellite 264, or to the cell tower 266, a status of the sources, a status of the receivers, a status of the batteries of the receivers or autonomous nodes, a status of their memory, a status of the amount of seismic data recorded and stored, a temperature of the ambient, any environmental parameter, etc. As can be seen from the partial list noted above, the survey ancillary data associated with a seismic survey system 200 may include many parts and the survey ancillary data can be defined as any data but seismic data that is/can be generated during a seismic survey, as attribute to this survey, whereas seismic data is the raw sampling data directly acquired by the sensors with the aim of imaging the underground. All these parts may be exchanged (automatically or when initiated by the operator) between the various components of the system during the seismic data survey and this job is not straightforward especially if some or all the components are out of reception of an existing communication network.

Figure 3:
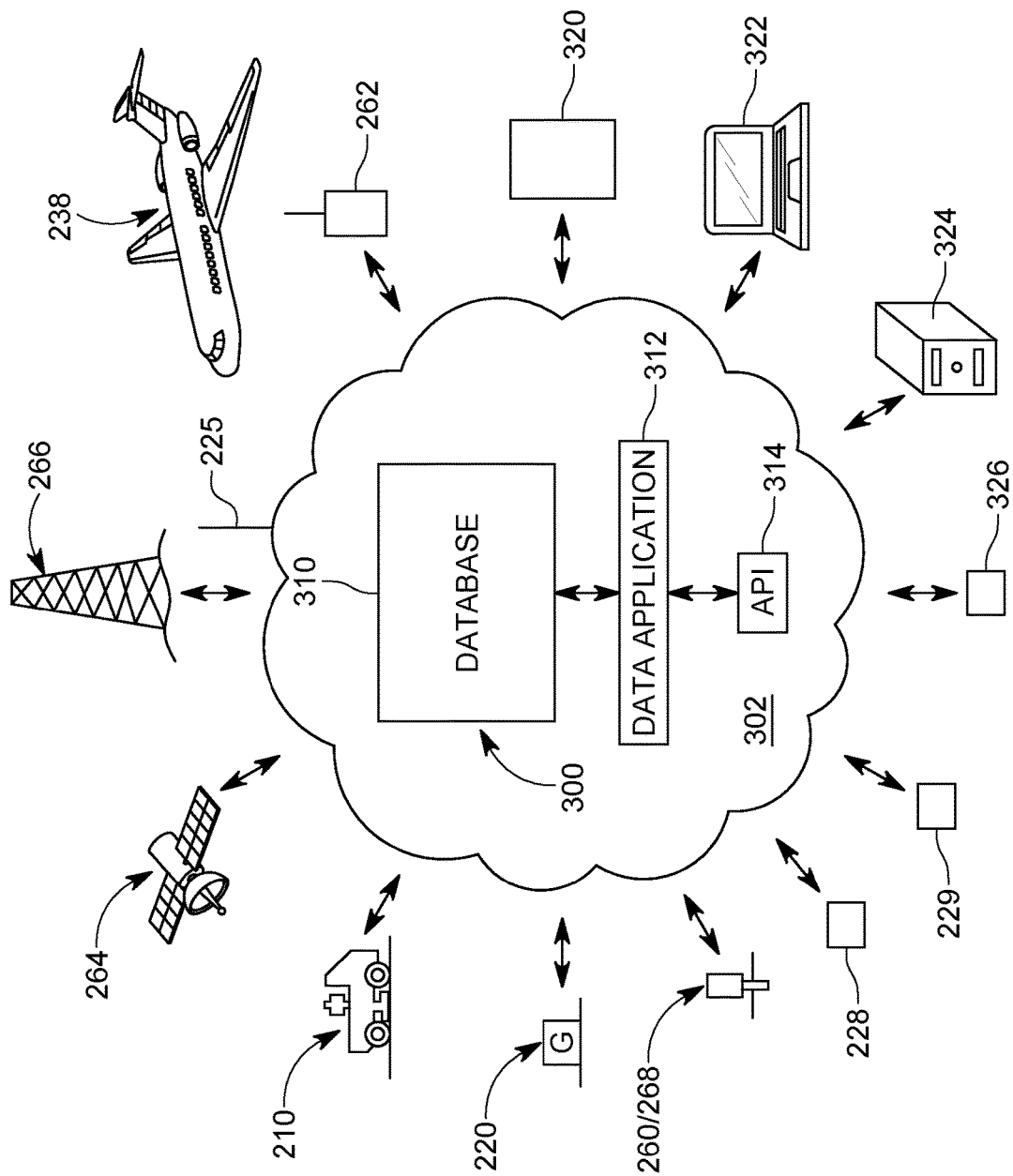
FIG. 3 schematically illustrates a cloud-based, time-limited, confidentiality-rated system for storing and sharing survey ancillary data among plural users and seismic equipment and the various interactions with them.

According to an embodiment, a novel cloud-based, time-limited, confidentiality-rated data management system 300 (simply called herein the "system") for survey ancillary data sharing is now discussed with regard to FIG. 3. Note that "cloud-based" should be understood as defining an "external server", which might be the "cloud" as used by third-party, public providers, but also a private server. The system 300 can be configured to use wired or wireless means (public or private) to communicate with various seismic acquisition elements (for example, the vibrators, nodes, local controllers, central unit of the system shown in FIG. 2), and the wired or wireless means include but are not limited to wireless radio signals (e.g., radio frequency signal, Bluetooth, Wi-Fi, Li-Fi, satellite signals, etc.), wired electromagnetic signals, optical signals, etc. In other words, the system 300 takes advantage of any known communication protocol to communicate with the seismic equipment. The system is also configured to communicate with plural users or actors, for example, the operator of the seismic survey, the client that ordered the seismic survey, various contractors that provide support for the seismic survey, administrators of the survey/system, essentially with anybody that might have an interest in the seismic survey and is authorized by the operator or owner. The system has also the capability to store, acquire, upload and download data. The system may be configured to give access to various actors to the data, to edit, delete, add, remove, etc. Each actor may receive different credentials for performing one or more of the actions noted above.

The system 300 includes, as illustrated in FIG. 3, a data storage module 310 that is hosted in a cloud 302. The data storage module 310 may be a database hosted by a memory. While the cloud 302's infrastructure might be owned by a third party, i.e., a company that provides cloud services, the system 300 is implemented on top of the cloud 302 and is owned by the operator of the survey. In other words, the cloud, which is made up of plural servers or other similar hardware, hosts and runs the files and/or applications of the seismic operator. This does not prevent the seismic operator to run the system 300 on its own server/cloud if necessary. The operator of the survey or the seismic operator is an entity that either owns the system 300, or has been delegated authority by the owner of the system 300 to run the system. For example, in one application, the seismic operator is a seismic survey provider or contractor, which was given power by the entity (e.g., client) that ordered the seismic survey, to manage the system 300. In another application, the seismic operator may include two or more contractors. In yet another application, the seismic operator may be the client.

To access and interact with the data storage module 310, a data application 312 is also provided in the cloud 302, and is configured to provide a gate to the module 310. The data application may be implemented as a collection of computer instructions and/or software that can reside and be executed in the cloud and that have direct access to the data storage module 310. In one application, the system 300 may also include an application programming interface, API, 314 that ensures that any message received from outside the cloud is interpreted for the data application 312, and vice versa, i.e., any message generated by the data application 312 is "translated" by the API 314 so that the various users can understand it.

FIG. 3 schematically shows that any component 210, 220, 228, 229, 260, 262, 268 of a seismic survey, any communication means (e.g., wires 225, aircraft 238, cellular tower 266 for 4G, LTE, 5G protocols, satellite 264), any mobile device (tablet 320, laptop 322, any smart device), any wired computing system (e.g., personal computer 324) and any router type device (e.g., optical fiber router 326 or similar optical device) may be connected to the cloud 302 through the API 314, to access information on the database 310. All the links between (1) the various elements shown outside the cloud in FIGS. 3 and (2) the cloud may be implemented in a wired or wireless manner. Other devices may also connect to the database 310.

Figure 4:
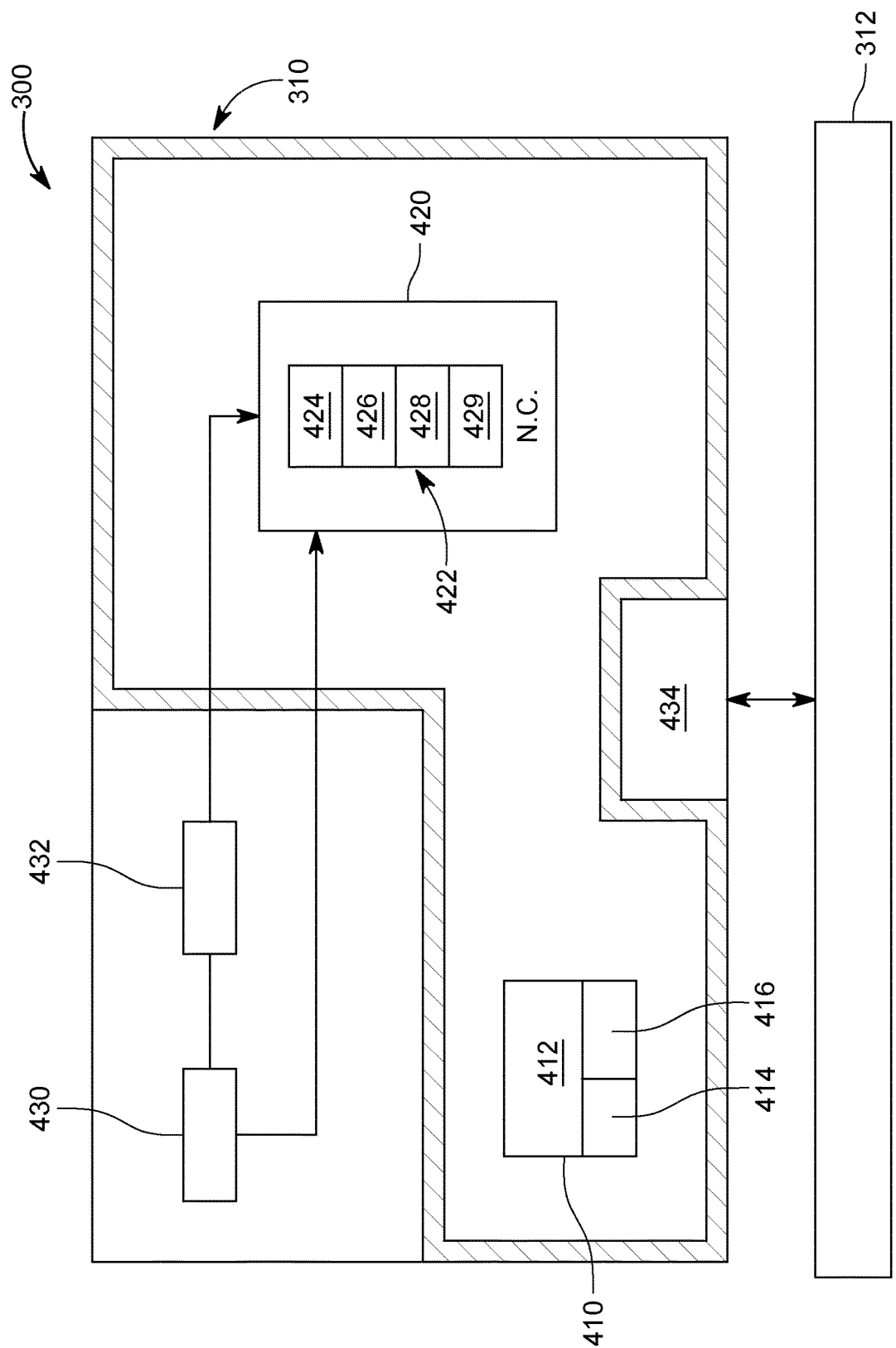
FIG. 4 schematically illustrates the cloud-based, time-limited, confidentiality-rated system.

In one embodiment, the database 310 may be partitioned to handle at least two types of data: a first level of confidential data and a second level of confidential data. In other words, the database has regions that are confidentiality-rated and each data received by the data application 312 is directed to the correct region. In one application, the first level of confidentiality is assigned to any seismic data, i.e., data that remains after the seismic data acquisition is over and this data may include the duplicate of the operational data discussed above, i.e., that data that is necessary for processing the seismic data, and the second level of confidentiality is assigned to any survey ancillary data, i.e., data that is destroyed at the end of the seismic data survey and this data may include the original operational data. This means that the original operational data is destroyed when the survey ancillary data is destroyed, while the duplicate of the operational data remains together with the seismic data. Note that the duplicate of the operational data may be a subset of the original operational data, i.e., the duplicate of the operational data may include less information than the original operational data. In one embodiment, as illustrated in FIG. 4, the database 310 has a first level confidential region 410 and a second level confidential region 420. Other regions may be present. The first level confidential region 410 stores any data 412 that needs to preserve its confidentiality with a high degree, for example, passwords of various seismic survey equipment that need access to the database 310, or seismic data 414 acquired by one of the seismic survey equipment of the seismic system 200, or the duplicate 416 of the operational data etc. The second level confidential region 420 stores survey ancillary data 422, which was defined above and its confidentiality is not as critical as the seismic data. In one application, a contract between the operator of the seismic survey and the party that paid for the seismic survey defines what is first level confidential and what is second level confidential. For example, it is possible that access to the first level confidential data requires a two-factor authentication approach while access to the second level confidential data requires simply authentication (i.e., only username and password). In another embodiment, the first level confidential data is protected such that only an administrator can erase/modify it while the second level confidential data can be erased/modified by any party that has access to the system 300. As a matter of rule, the entire seismic data acquired by the various receivers is always first level confidential. The status of the survey ancillary data varies, with the duplicate 416 of the operational data being confidential and the original operational data being different. However, samples of the seismic data that are used for quality checks during the execution of the seismic survey, for example, for checking the quality of seismic lines for straightness (changes in azimuth) and distance between shot points, or for reporting summary statistics including duplicate points, point counts, and points outside the threshold values, or for flagging records outside of the threshold by point number are not considered to be seismic data. In other words, partial seismic data used exclusively during the acquisition phase of the seismic survey for quality control purposes is considered herein to be survey ancillary data, while the full seismic data used exclusively after the termination of the acquisition phase for determining the final image of the surveyed surface is considered seismic data. Thus, the survey ancillary data may include a limited amount of seismic recordings that are used only during the acquisition phase of the seismic survey.

Because of the nature of the survey ancillary data 422, i.e., (I) data that is used exclusively (1) during the acquisition phase of the seismic data, and (2) to determine the quality of the acquisition and adjust this phase if the acquisition is not up to the standard, and (II) operational data that is used during processing of the seismic data, this data not only is stored in the second level confidential portion 420 of the database 310, but is also configured to be erased/destroyed/removed from the cloud after a given period of time (called herein the "lifetime"), which is shorter or equal to the remaining time of the concerned seismic survey. In one application, all the survey ancillary data 422 is configured to be erased after 7 days the latest. In another application, the survey ancillary data 422 is divided into various categories, for example, QC data 424, status data 426, geolocation data 428, original operational data 429, etc., and each category has its own destruction time/lifetime, e.g., 7 days for the QC data, 4 days for the status data, and 1 day for the geolocation data. The original operational data 429 may be destroyed together with any of the other categories of data or may have its own destruction time/lifetime. Other numbers may be used for the lifetime. The time-limited life of the survey ancillary data 422 is set up because this data is necessary, for example, only as long as the seismic acquisition phase of a dedicated survey is ongoing, and in some cases, even for shorter times, e.g., until the equipment moves to another location, or until a given line of receivers is acquired—or immediately after having been downloaded by a predefined administrator or group of users.

Thus, for the survey ancillary data 422, a time module 430 is also present to keep track of the lifetime of each type of data. The time module 430 may be implemented in software, hardware or a combination of the two. The time module 430 is capable to be configured to monitor each category of the survey ancillary data and to instruct an erase module 432, at the end of the timelife of a given data category, to delete that data category from the database 310. The erasing phase anyway takes place before the end of the seismic survey. Once the survey ancillary data 422 is deleted from the database, it cannot be accessed by any equipment or party. This means that after the termination of the seismic survey, no further exchange of the survey ancillary data 422 is possible from the system 300. In one embodiment, the database 310 and the data application 312 are configured so that no processing of the survey ancillary data is possible in the system 300, i.e., even during the acquisition phase of the seismic data, the survey ancillary data cannot be processed in the system 300. This means that the system 300 is used only as a buffer, to store the survey ancillary data. To process the survey ancillary data, a user needs to retrieve the information from the system 300 and then process it on its own system. For example, the QC data 424 is only stored in the database 310, but never processed there. The CU 250 or the controller 229 is the place where this data is processed for each seismic survey. In other words, the survey ancillary data in this embodiment is only stored in the database 310 and shared with any seismic acquisition equipment. Thus, for this application, the database 310 serves purely as a repository resource, and not for running simulations or imagining the subsurface.

The deletion of the survey ancillary data 422 may take place while the acquisition phase of the seismic data is in progress or, in some cases, as soon as the acquisition phase is over. Thus, at the end of the acquisition phase or at the end of the seismic survey, all the survey ancillary data 422 is removed from the database 310. To have available the duplicate 416 of the operational data in the first region 410, in one embodiment, the original operational data 429 from the second region is copied to the first region 410 as soon as the original operational data 429 arrives in the second region. In one application, the survey ancillary data is removed at the end of the seismic survey. Thus, the survey ancillary data has a lifetime shorter than a duration of the seismic survey (or even shorter than a duration of the acquisition phase). This is different from the seismic data 414, or the duplicate 418 of the operational data, which could reside in the database 310 for as long as necessary, even after the seismic survey has ended. In fact, the first level confidential data 412 needs to stay in the first level confidential region 410 of the database 310 after the acquisition phase is over if this data includes the collected seismic data 414, as the processing of the seismic data is not ended after the acquisition phase has concluded. In this regard, note that the seismic data is generally processed after the acquisition phase has started, sometimes after it has been finalized and this processing stage may take weeks if not months. By this time, all the survey ancillary data 422 has been deleted from the database 310. In one application, the first level confidential data 412 does not include any seismic data.

In one embodiment, which may be combined with any other embodiment herein, the data application 312 is configured to check each incoming command/message and determine whether the command/message is related to first level confidential or second level confidential data. Depending on this determination, the data application 312 accesses the first level confidential or second level confidential region in the database 310. One user or equipment that accesses one type of data does not automatically have the rights to access the other type of data. The owner of the database 310 may attribute these rights to the users or equipment either in the data application 312 or in the API 314. Thus, the two regions 410 and 420 are strictly separated from each other although they are stored in the same database 310. In one application, the system 300 may be configured to not have the first level confidential region 410, i.e., to deal exclusively with the second level confidential region and corresponding survey ancillary data 422. Thus, at a minimum, the system 300 includes elements 420, 430, and 432. In one variation of this embodiment, the system 300 may also include elements 410 and/or 434.

The data exchange between the system 300 and various users and/or equipment of system 200 can take place, as schematically illustrated in FIG. 3, over any type of communication link. Given the fact that sometimes the seismic acquisition equipment is located in regions where there is no service available for data exchange, it is possible that delays appear between when the survey ancillary data is generated and when it is uploaded to or downloaded from the database 310. This means that the communication between the equipment and the database may be sporadic, only taking place when a satellite or aircraft or mobile device is passing by the acquisition system 200. However, for the purposes of the survey ancillary data 422, this non-continuous or asynchronous communication style is acceptable.

The survey ancillary data may also be shared with other seismic surveying acquisition campaigns. For example, two different surveys may be taking place at the same time over adjacent plots of land. For this situation, it is desirable that the first survey knows when the sources of the second survey start sweeping and at what positions so that the sources of the first survey do not sweep at the same time and/or at locations very close to the sources of the second survey. Also, it is desired to be able to instruct the receivers of the first survey to not record the sweeps generated by the sources of the second survey and vice versa. All these conditions can be fulfilled if the first survey knows the operations conditions of the second survey and vice versa. Thus, the database 310 may be used by the equipment of plural surveys to share only second level confidential data (the survey ancillary data) and not the first level confidential data (seismic data). In one application, the operators of the two surveys may share only the status data 426 and the geolocation data 428, but not the QC data 424. In other words, the database 310 and the data application 312 may be configured to share anything between selected types of second level confidential survey ancillary data 422 to the full array of second level confidential survey ancillary data 422. For example, different users may use a common "key" for accessing the database 310, while a first user may have access to first and second level confidential data, while a second user may have access only to the second level confidential data. In one application, the system 300 hosts first and second confidential level data related to plural seismic surveys, and a user may have access to data related to only one seismic survey of the plural seismic surveys.

Although the survey ancillary data 422 has a different confidential level than the seismic data, access to it is restricted by the API 314 as not any member of the public can access it. Access to the survey ancillary data 422 is intended in this embodiment to be allowed only for the operator of the seismic survey and its equipment, for the beneficiary of the seismic survey, and any other party allowed by the operator or the beneficiary. To ensure that only authorized users and equipment are allowed to access the database 310, the API 314 may be configured to manage individual accounts for each user or equipment entitled to access the database 310. For example, the API 314 may be configured to permit the users to make an account with the data application 312. For the equipment of the system 200, the owner of the database 310 creates corresponding accounts so that the equipment can upload and/or download data to or from the database. Based on these accounts, a user or equipment may then access the survey ancillary data 422 according to responsibility-based access rights 434, which may be defined by the survey's operator or beneficiary. The responsibility-based access rights 434 may be a set of rules stored in a memory in the cloud.

The responsibility-based access rights 434 assign a role, e.g., access to QC data, access to geoposition data, access status data, access to a combination of data, or access to all the survey ancillary data, or access to confidential data, or access to both first level confidential and second level confidential data, etc. The access rights may give permission to a user or equipment to: login into the conventional data, upload and/download the conventional data, modify the conventional data, erase the conventional data, view active seismic surveys and their associated conventional data; view a seismic actions log detailing the activities of an equipment or user with regard to a corresponding survey, attach or delete documents, add notes to the system, and delete system entries. However, other access permissions are contemplated, as e.g., a "user access" allowing only to upload and download data and an "administrator access" allowing to also erase data, and even "mute" a user by revoking a troubled equipment.

In one implementation, the operator of the survey is considered to have the administrator role, which allows the highest level of access to the database 310. The administrator can manually override the time module 430 to shorten or lengthen the lifetime of any type of data. The administrator may also manually change the type of data of a given data, for example, the administrator can change the designation of seismic data, which is first level confidential, to be second level confidential. The opposite is also true, i.e., the administrator can change the second level confidential data to become first level confidential.

Any known protocol(s) may be used for achieving the communication between the user and/or equipment and the database 310. In one application, the Message Queue Telemetry Transport, MQTT, protocol can be used for the equipment. This is a lightweight, publish-subscribe network protocol that transports messages between devices. It is bandwidth-efficient and uses little battery power. This is desired as the nodes 260 and 268 in FIG. 2 are power autonomous and do not have a large amount of power available. Also, if the satellite 264 or aircraft 238 is used for communication, such message consumes little energy to be transported to the cloud and needs an insignificant amount of bandwidth. Note that such a protocol would be impractical for transmitting seismic data as this data becomes large over weeks for seismic acquisition.

Figure 5:
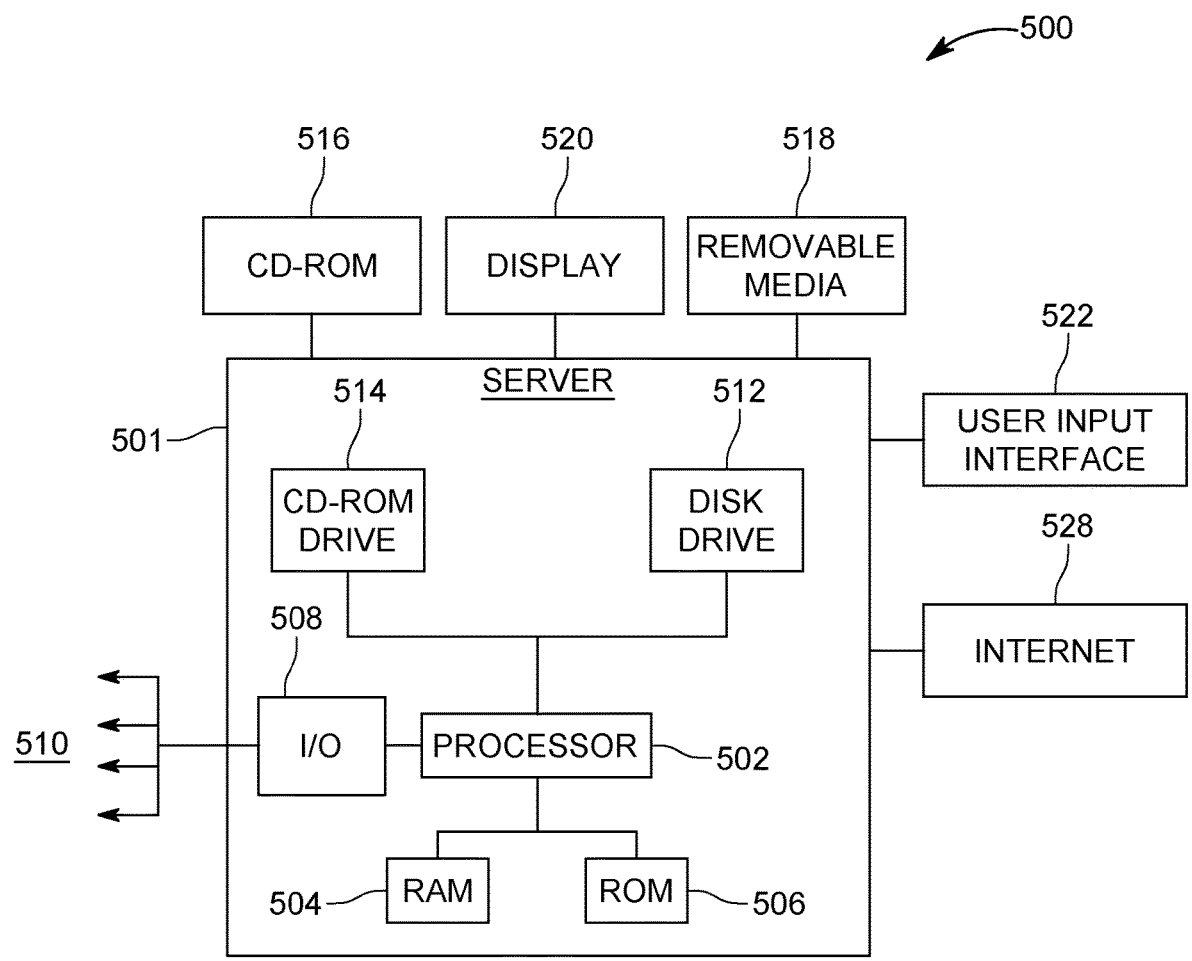
FIG. 5 is a schematic diagram of a computing system in which the cloud-based, time-limited, confidentiality-rated system can be implemented.

In one embodiment, the system 300 may be implemented in the computer environment 500 illustrated in FIG. 5. Hardware, firmware, software or a combination thereof may be used to perform the various steps and operations described above. Computing environment/system 500 suitable for performing the activities described above may include a server 501. Such a server 501 may include a central processor (CPU) 502 coupled to a random access memory (RAM) 504 and to a read-only memory (ROM) 506. The central processor 502 may host the erase module 432, the time module 430, and the access-rights module 434. The memory 504 and/or 506 or any equivalent memory may host the database 310, i.e., store any of the first level confidential and second level confidential data. The processor 502 may also store the data application 312 and/or the API 314. ROM 506 may also be other types of storage media to store programs, such as programmable ROM (PROM), erasable PROM (EPROM), etc. Processor 502 may communicate with other internal and external components through input/output (I/O) circuitry 508 and bussing 510 to provide control signals and the like. Processor 502 carries out a variety of functions as are known in the art, as dictated by software and/or firmware instructions.

Server 501 may also include one or more data storage devices, including hard drives 512, CD-ROM drives 514 and other hardware capable of reading and/or storing information, such as DVD, etc., any of which may be used to host the database 310. In one embodiment, software for carrying out the above-discussed steps may be stored and distributed on a CD-ROM or DVD 516, a USB storage device 518 or other form of media capable of portably storing information. These storage media may be inserted into, and read by, devices such as CD-ROM drive 514, disk drive 512, etc. Server 501 may be coupled to a display 520, which may be any type of known display or presentation screen, such as LCD, plasma display, cathode ray tube (CRT), etc. A user input interface 522 is provided, including one or more user interface mechanisms such as a mouse, keyboard, microphone, touchpad, touch screen, voice-recognition system, etc.

Server 501 may be configured to communicate, over an internet-based connection or other types of connections, to other devices, such as sources, detectors, or any other equipment of a seismic acquisition system. The server may be part of a larger network configuration as in a global area network (GAN) such as the Internet 528, which allows ultimate connection to various landline and/or mobile computing devices.

Figure 6:
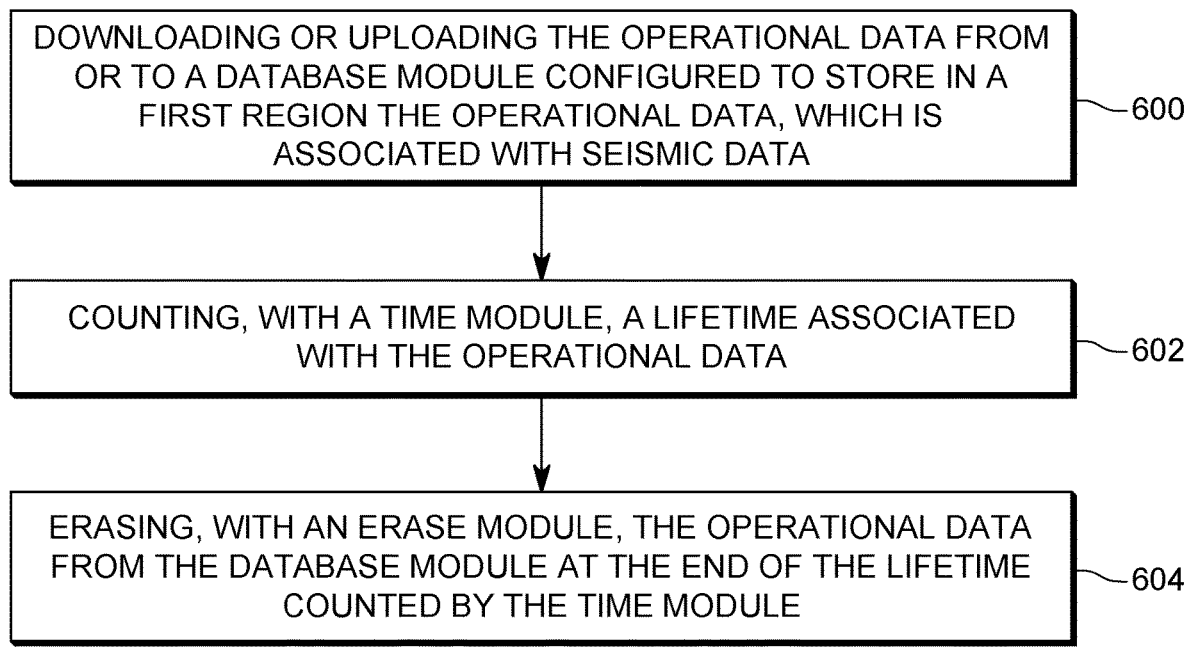
FIG. 6 is a flow chart of a method for storing and sharing survey ancillary data through the cloud-based, time-limited, confidentiality-rated system.

A method for sharing the survey ancillary data 422 through the cloud-based, time-limited, confidentiality-rated data management system 300 is now discussed with regard to FIG. 6. The method includes a step 600 of downloading or uploading the survey ancillary data from or to a database module configured to store in a first region the survey ancillary data, a step 602 of counting, with a time module, a lifetime associated with the survey ancillary data, and a step 604 of erasing, with an erase module, the survey ancillary data from the database module at the end of the lifetime counted by the time module. The lifetime of the survey ancillary information is shorter than the remaining time of the survey.

In one application, the survey ancillary data is processed while residing in the database module. The method may further include storing in a second region of the database module seismic data or duplicates of survey ancillary data, namely operational data linked to seismic data. The operational data is a second level confidential data while the seismic data is a first level confidential data. In one embodiment, the survey ancillary data includes at least one of quality control data, status data, and geoposition data, all of which are associated with equipment that is used for generating/acquiring the seismic data. The survey ancillary data may include information about two different seismic surveys that simultaneously take place. The survey ancillary data may include different categories of second level confidential data, and each category has a different lifetime for destruction. The method may further include checking, with a responsibility-based access rights module, that each equipment of the seismic survey reaches only assigned survey ancillary data. The method may further include a central unit of the seismic survey uploading an survey ancillary parameter to the database module, and a first equipment of the seismic survey downloading the survey ancillary parameter from the database module.

The disclosed embodiments provide a system and a method for temporary storing survey ancillary data associated with a seismic survey in the cloud, for sharing purposes and not for processing. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] U.S. Patent Application Publication No. 2013/0185773.
[2] U.S. Patent Application Publication No. 2015/0085604.

What is claimed is:

1. A cloud-based, time-limited, confidentiality-rated data management system for survey ancillary data associated with acquisition of seismic data during at least one seismic survey, the system comprising:
   a database module configured to store in a first region the survey ancillary data;
   a data application configured to interact with the database module and upload or download the survey ancillary data;
   a time module configured to count a lifetime associated with the survey ancillary data; and
   an erase module configured to erase the survey ancillary data from the database module at the end of the lifetime counted by the time module,
   wherein the lifetime of the survey ancillary data is shorter than a duration of the acquisition of the seismic data of the at least one seismic survey.

2. The system of claim 1, wherein the survey ancillary data is not processed in the database module while residing in the database module.

3. The system of claim 1, wherein the database module further comprises:
   a second region for storing the seismic data.

4. The system of claim 3, wherein the survey ancillary data comprise operational data, said operational data being also stored in the second region.

5. The system of claim 4, wherein the seismic data includes a duplicate of the operational data.

6. The system of claim 1, wherein the survey ancillary data includes at least one of quality control data, status data, and geoposition data, all of which being associated with equipment that are used for acquisition of the seismic data.

7. The system of claim 1, wherein the survey ancillary data includes information about two different seismic surveys that simultaneously take place.

8. The system of claim 1, wherein the survey ancillary data is configured to be erased by an operator of the system.

9. The system of claim 1, further comprising:
   a responsibility-based access rights module which checks that each party associated with a seismic survey reaches only assigned survey ancillary data in the database module.

10. A method for sharing survey ancillary data generated during a seismic survey through a cloud-based, time-limited, confidentiality-rated data management system, the method comprising:
    downloading or uploading the survey ancillary data from or to a database module, which is configured to store in a first region the survey ancillary data;
    counting, with a time module, a lifetime associated with the survey ancillary data; and
    erasing with an erase module, the survey ancillary data from the database module at the end of the lifetime counted by the time module,
    wherein the lifetime of the survey ancillary information is shorter than a duration of seismic data acquisition during the seismic survey.

11. The method of claim 10, wherein the survey ancillary data is not processed in the database module while residing in the database module.

12. The method of claim 10, further comprising:
    storing in a second region of the database module seismic data.

13. The method of claim 12, wherein the survey ancillary data comprise operational data and the operational data are also stored in the second region.

14. The method of claim 13, wherein the seismic data includes a duplicate of the operational data.

15. The method of claim 10, wherein the survey ancillary data includes at least one of quality control data, status data, and geoposition data, all of which being associated with equipment that is used for acquisition of the seismic data.

16. The method of claim 10, wherein the survey ancillary data includes information about two different seismic surveys that simultaneously take place.

17. The method of claim 10, wherein the survey ancillary data includes different categories with a different lifetime for destruction.

18. The method of claim 10, further comprising:
    checking, with a responsibility-based access rights module, that each equipment of the seismic survey reaches only assigned survey ancillary data.

19. The method of claim 10, further comprising:
    a central unit of the seismic survey uploading an operational parameter to the database module; and
    an equipment of the seismic survey downloading the operational parameter from the database module.

20. A non-transitory computer readable medium including computer executable instructions, wherein the instructions, when executed by a processor, implement a method for sharing survey ancillary data through a cloud-based, time-limited, confidentiality-rated data management system, the medium comprising instructions for:
    downloading or uploading the survey ancillary data from or to a database module configured to store in a first region the survey ancillary data, which is associated with seismic data;
    counting, with a time module, a lifetime associated with the survey ancillary data; and
    erasing, with an erase module, the survey ancillary data from the database module at the end of the lifetime counted by the time module,
    wherein the lifetime of the survey ancillary information is shorter than an acquisition time of the seismic data during a seismic survey.

21. The medium of claim 20, wherein the survey ancillary data is not processed in the database module for seismic imagining while residing in the database module.

* * * * *